INVENTOR.
KURT HILLMAN
BY
R. J. Frank
ATTORNEY.

April 11, 1967 K. HILLMAN 3,313,956

AMPLITUDE DISCRIMINATOR WITH AUTOMATIC CHECKING
AND COMPENSATING CIRCUITRY FOR BIAS LEVEL

Filed Oct. 1, 1964 2 Sheets-Sheet 2

INVENTOR.
KURT HILLMAN

BY R. J. Frank
ATTORNEY.

United States Patent Office 3,313,956
Patented Apr. 11, 1967

3,313,956

AMPLITUDE DISCRIMINATOR WITH AUTOMATIC CHECKING AND COMPENSATING CIRCUITRY FOR BIAS LEVEL

Kurt Hillman, Flushing, N.Y., assignor to General Telephone and Electronics Laboratories, Inc., a corporation of Delaware Filed Oct. 1, 1964, Ser. No. 400,829
10 Claims. (Cl. 307—88.5)

This invention relates to an amplitude discriminator and in particular to a tunnel diode amplitude discriminator in which a digital feedback loop is utilized to provide highly sensitive discrimination.

The increasing interest in communication systems using pulse code modulation or PCM techniques for the transmission of information has resulted in an increasing need for stable high-sensitivity amplitude discriminators. Briefly stated, PCM systems utilize various methods of quantization, wherein analog signals are sampled at a predetermined rate with each sample being represented by the nearest one of a perassigned number of discrete amplitude levels. Each amplitude level is then translated into binary notation by an encoder prior to transmission.

Quantization requires that signal amplitudes be compared with standard amplitudes. The devices used to effect these comparisons must discriminate between the unwanted amplitude levels and the amplitude level closest to the magnitude of the signal sample. The discriminator employed must exhibit a high sensitivity at low power levels and in addition, the sensitivity should be maintained substantially constant during continued operation.

Tunnel diodes are well-suited for use as the decision-making element in amplitude discriminators because of their high resolution and speed of recovery from an overload of either polarity. A tunnel diode has two regions of stable operation which are characterized by different voltage drops appearing thereacross and are hereinafter referred to as first or low voltage and second or high voltage states. These regions are defined by the portions of its static characteristic having a positive slope and are separated by a region of unstable operation having a negative slope. The region of unstable operation is offset with respect to the origin of its static characteristic. To overcome the effect of this offset, an operating bias is applied to the tunnel diode.

In a single-ended amplitude discriminator, the bias signal applied to the tunnel diode determines the sensitivity of the comparison and is selected to be quite close to the firing current required to trigger the diode into its second stable state. If this bias signal is subject to uncontrolled variations, it must differ from the diode firing current by an amount sufficient to prevent the bias signal alone from firing the diode. Thus, the operating bias should be supplied from a source not subject to appreciable uncontrolled variations in order to prevent degradation of the device sensitivity.

The sensitivity of tunnel diode discriminators is also limited by the variations in the diode firing current which results primarily from changes in the ambient temperatures. These temperature variations must be taken into account in initially determining the magnitude of the bias signal and therefore impose a limit on sensitivity unless a constant temperature environment is provided.

In bipolar or double-ended amplitude discriminators, a balanced pair of tunnel diodes are connected in series with the operating bias applied thereacross. The bias is generally a sinusoidal signal having a magnitude sufficient to fire one but not both tunnel diodes. The signal sample and reference waveform are applied to the connecting point of the tunnel diodes. The polarity of the net signal applied to the connecting point determines which diode fires. A change in the polarity of the net signal appears as a change in the polarity of the voltage at the common connecting point and indicates when the magnitude of the signal sample exceeds the magnitude of the reference waveform.

The sensitivity of the bipolar discriminator depends on matching the firing points of the tunnel diodes and maintaining the match during continued operation. Any uncontrolled unbalance in the diode firing points results in a variation in the discrimination sensitivity, since the diode firings no longer occur at the point when the polarity of the net signal changes but at some offset therefrom.

Accordingly, an object of the present invention is to provide an amplitude discriminator wherein the sensitivity is substantially constant without requiring a constant temperature environment.

A further object of the invention is the provision of an amplitude discriminator in which the bias signal is modulated to compensate for changes in the tunnel diode firing current.

Still another object is the provision of a high sensitivity amplitude discriminator.

In the practice of the present invention, an amplitude discriminator employing a tunnel diode as the decision-making element is supplied with an operating bias current. The magnitude of the bias current is set quite close to the particular firing current required to trigger the diode into its second stable or high voltage state. The effect of the bias current is to substantially overcome the offset of the tunnel diode firing point with respect to the origin of its static characteristic.

Since the bias current brings the diode close to its firing point, only a small additional current is needed to trigger the diode. In the process of discrimination, a reference wave-form and the signal to be compared are applied to the amplitude discriminator. When the reference and signal are unequal, a net current is supplied to the decision-making tunnel diode. If the polarity of the net current is the same as that of the operating bias, the sum of the bias and net current tends to trigger the diode into its second state.

The difference between the operating bias and the diode firing current determines the magnitude of the minimum net current required to trigger the diode. The minimum net current in turn determines the minimum difference between the reference and signal that can be sensed by the decision-making diode. The sensitivity of discrimination is dependent on this minimum net current and it is therefore advantageous to apply an operating bias current that is quite close to the diode firing current.

The tunnel diode firing current is found to change with variations in the ambient temperature thereby limiting and varying the sensitivity of discrimination. In addition, the firing current lies near the center of a zone of uncertainty wherein the internal noise of the diode affects the current required to fire the diode at a particular time. The probability of the diode firing at particular currents within the zone is found to increase as the zone is traversed.

In the present invention, the time between successive applications of a signal and reference to the amplitude discriminator is divided into two periods. One period is devoted to discrimination, with the signal and reference being removed at the completion thereof. The second period is concerned with checking the sensitivity of the decision-making tunnel diode and modulating the operating bias to maintain the sensitivity substantially constant.

At the completion of the checking and discriminating periods, the diode is returned to its first stable or low voltage state. This is done by supplying a reset current having a magnitude greater than the operating bias and of opposite polarity to the tunnel diode. It is to be noted that the operating bias is continually applied to the tunnel diode.

The checking period starts with the tunnel diode in its first state, whereupon a test current of predetermined magnitude is supplied to the tunnel diode. The test current magnitude is selected to be equal to the difference between the tunnel diode firing current and the nominal or unmodulated operating bias. If neither the operating bias nor the diode firing current have changed, the diode should fire. Since it is now within the zone of uncertainty, the actual firing cannot be conclusively predicted.

The response of the tunnel diode to the test current is passed to a feedback circuit. The feedback circuit is connected to the output of the discriminator and comprises an "and" gate, amplifying means, an integrator, and a resistive element. The resistive element is returned to the tunnel diode.

The response of the tunnel diode to the test current results in a pulse output if it has fired or in no output signal if it has not. The application of an enabling pulse to the "and" gate subsequent to the application of the test current passes an output pulse to the input of the amplifying means. The amplifying means, such as a flip-flop, is of the type having two possible output voltages. The amplifying means is connected such that the input pulse thereto is amplified and inverted. Therefore, the absence of an input pulse results in the amplifying means providing its larger output voltage.

The output of the amplifying means is connected to a resistance-capacitance integrator. The output signal of the integrator is fed through a resistive element back to the tunnel diode decision element. The current supplied through the resistive element is the tunnel diode operating bias. If the sum of this bias current and the test current equal the tunnel diode firing current, the diode should fire approximately one-half the total number of checkings as it is located at the center of its zone of uncertainty.

Initially, the current supplied through the resistive element is much less than the nominal operating bias and the application of the test current will not trigger the diode. Thus, the amplifying means output increases the integrator output voltage until the bias current is sufficient to fire the diode during checking. The magnitude of the resistive element is selected such that at the nominal operating bias current, the integrator output is midway between the two possible amplifying means output voltages. Also, the magnitude of the resistance of the integrator is selected to be considerably smaller than that of the resistive element to insure that substantially all of the dynamic range of the amplifying means output voltages is available at the input of the integrator.

By selecting the time constant of the integrator to be at least as large as the product of the total period between the application of successive test currents and the ratio of the tunnel diode firing current to the width of the zone of uncertainty, the variation of the bias current fed back to the diode may be reduced to the order of the width of the zone. This zone is of the order of 1 $\mu$a. for a tunnel diode having a 1 ma. firing current. Therefore, the operating bias can be maintained constant within a range of the order of a tenth of a percent.

In addition, any increase or decrease in the firing current of the tunnel diode is compensated for by the feedback circuit. If the firing current increases, the diode is less likely to fire upon application of the test current. Thus, the probability rises that the integrator output voltage will increase and increase the operating bias current. A similar change in probability occurs for a decrease in the diode firing current. If the diode firing current should change sufficiently so that the sum of the operating bias and rest currents does not reside in the zone of uncertainty, the correction becomes certain to occur. It is to be noted that the bias signal is modulated to keep the discriminator sensitivity substantially constant during varying temperature operation and, in addition, to correct for changes in the tunnel diode firing current so that the sensitivity is maintained at this different firing current.

Further features and advantages of the invention will become more readily apparent from the following description of specific embodiments when taken in conjunction with the accompanying drawings, in which.

Figure 1:
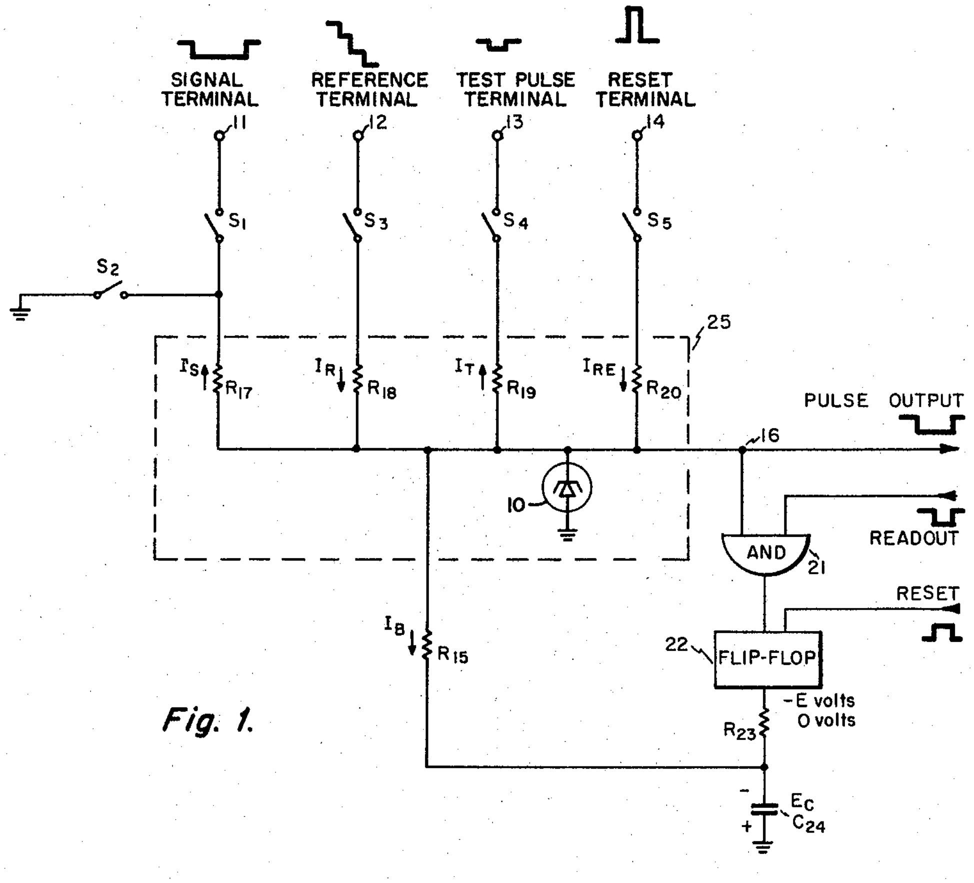
FIG. 1 is a block diagram of one embodiment of the invention.
Figure 2:
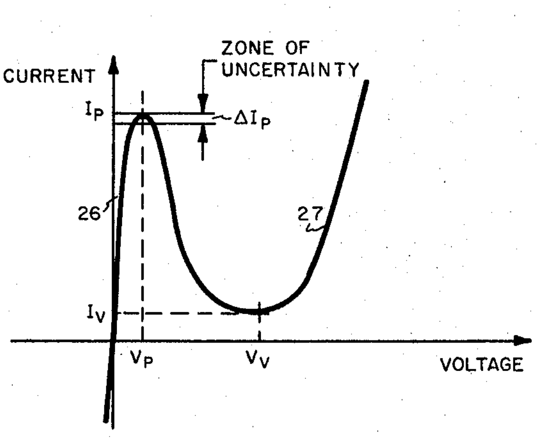
FIG. 2 is a graph of a tunnel diode current-voltage characteristic.

Referring more particularly to FIG. 1, tunnel diode 10 is employed as the decision-making element of amplitude discriminator 25. The tunnel diode has a distinctive current-voltage characteristic, as shown by the graph of FIG. 2, wherein the first and second stable states of the diode are defined by the regions 26 and 27 respectively, having a positive slope. When the current through the tunnel diode 10 exceeds the firing current $I_p$, the diode is triggered into its second stable state with a higher voltage thereacross equal to or exceeding the valley voltage $V_v$. To reset the diode into its first stable state, it is necessary that the current therethrough should be decreased to a magnitude substantially equal to the valley current $I_v$.

The diode 10 of FIG. 1 is shown with its anode connected to ground and is therefore responsive in accordance with the graph of FIG. 2 to negative currents. As used herein, negative currents are those currents flowing from ground to a lower potential. For positive currents, the diode acts essentially as a short circuit. To improve sensitivity, a positive voltage source may be connected in series with the anode of the tunnel diode to compensate for the voltage drop $V_p$ thereacross. Since the firing current $I_p$ is spaced from the origin, an operating bias is supplied to the diode through resistor $R_{15}$. In this embodiment, bias current $I_B$ comprises nominal D.C. current having a magnitude of 0.99 ma., with tunnel diode 10 having a firing current $I_p$ of 1 ma. The discrimination sensitivity is the difference therebetween of 0.01 ma.

By closing switch $S_3$, the positive staircase reference signal applied at terminal 12 supplies a positive current $I_R$ to the diode. Likewise, closing switch 1 and opening switch 2 causes the negative signal current $I_S$ to oppose the reference current $I_R$. As shown, the bias current $I_B$ is negative with its magnitude determined by capacitor voltage $E_c$ and resistor $R_{15}$. If the signal current $I_S$ exceeds the reference current $I_R$ by 0.01 ma., the net current through diode 10 is equal to or exceeds the firing current $I_p$ and the diode is triggered into its high voltage state. Since the diode does not fire if the difference between the currents $I_R$ and $I_S$ is not 0.01 ma., the tunnel diode discriminates against all steps of a staircase reference until the one nearest to without exceeding the signal sample is reached. However, once fired, the diode remains in its second stable state for the remainder of the reference waveform. The output across diode 10 may be utilized in subsequent processing circuits as desired.

It is seen from the above discussion that the difference between the operating bias and the firing current of the diode determines the sensitivity of the discrimination performed by the diode. Thus, it is desirable to reduce this difference to a minimum. Also, any variation in either the diode firing current or the operating bias results in an undesirable variation in sensitivity.

The firing current of a tunnel diode is characterized by a "zone of uncertainty" wherein the internal noise of the diode has a significant effect on the diode triggering characteristic. For a 1 ma. tunnel diode, this region is of the order of 1 $\mu$a, shown in FIG. 2 as $\Delta I$, and at any point within this zone, the diode may or may not fire. However, the probability with which a firing can be predicted increases as the zone is traversed in the direction of an increasing voltage thereacross. By limiting the variations of the operating bias to within a range of the order of the above zone, the sensitivity of the discriminator is substantially increased. However, it has been found that the firing current may increase or decrease with variations in ambient temperature depending on the doping level and the resistivity of the semiconductor material of the tunnel diode. It is therefore necessary to provide a compensating increase or decrease in the operating bias so that the sensitivity of the discriminator remains substantially constant.

To this end, switches $S_2$ and $S_5$ are closed and switches $S_1$ and $S_3$ are opened at the completion of the discriminating operation. This results in the removal of the signal sample and reference waveform from the circuit and resets tunnel diode 10 in its first state due to the flow of a positive current $I_{RE}$. It is to be noted that the operating bias is not removed from the circuit and the magnitude of the reset pulse at terminal 14 and resistor $R_{20}$ should be selected such that the positive reset current $I_{RE}$ is about 1.2 ma. This insures that the 0.99 ma. operating bias is overcome to permit resetting of the diode.

The reset current is removed by opening switch $S_5$ and a negative test current $I_T$ is then applied by closing switch $S_4$. The magnitude of the test pulse applied at terminal 13 and of the resistor $R_{19}$ are selected to provide a test current $I_T$ of 0.1 ma. If the bias current $I_B$ and the firing current of the diode have remained constant, the application of the test current is sufficient to bring the tunnel diode to the firing point. Any decrease in bias current or increase in firing level may result in the diode remaining in its first or low voltage state, since the test current magnitude may no longer be sufficient to fire it.

The voltage across diode 10 is fed to a negative feedback circuit at connecting point 16 containing "and" gate 21. As known in the art an "and" gate has a plurality of inputs and provides a single output only if its inputs are energized simultaneously. The application of an enabling pulse to "and" gate 21 subsequent to the application of the test pulse, passes a pulse to an amplifying means such as flip-flop 22 if the diode has been fired into its second or high voltage state by test current $I_T$. If the diode has not fired, no pulse is passed by "and" gate 21. Flip-flop 22 may be a conventional multivibrator having a zero output in response to a pulse passed by "and" circuit 21 and a negative output, such as —E, if no pulse is passed. Also, a D.-C. amplifier may be used as the amplifying means if desired. It is to be noted that flip-flop 22 is reset to its negative output state by the application of a reset pulse thereto prior to the application of the enabling pulse to "and" gate 21.

The output of flip-flop 22 is integrated by series resistor $R_{23}$ and shunt capacitor $C_{24}$ to establish the operating bias of the tunnel diode. The voltage $E_c$ developed across capacitor $C_{24}$ contains both an A.C. and a D.C. component. The resistor $R_{15}$ is selected such that the nominal D.C. component of capacitor voltage $E_c$, determined by the product of $R_{15}$ and the nominal bias current $I_{BO}$ (0.99 ma.) becomes about one half of the available supply voltage, —E. If resistor $R_{23}$ is made substantially smaller, for example by a factor of 10, than resistor $R_{15}$, the D.C. component of capacitor voltage $E_c$ can assume values within the approximate range of 0 to —E volts. The nominal value of this component is then established at $-E/2$ with approximately equal diode firing and non-firings.

Figure 3:
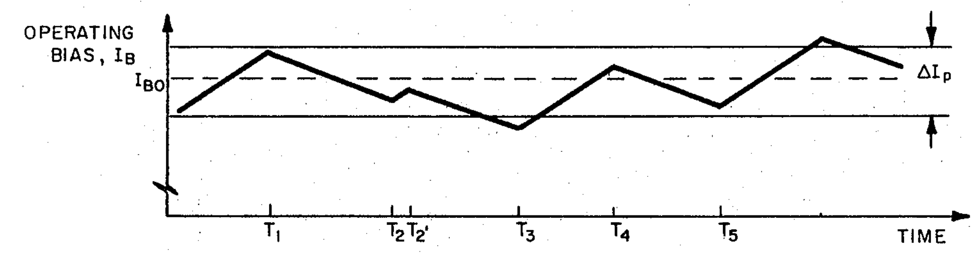
FIG. 3 is a graph of the operating bias of the embodiment shown in FIG. 1.

The A.C. component, shown in FIG. 3 modulates the nominal bias current $I_{BO}$ of 0.99 ma. in accordance with the response of tunnel diode 10 to the test pulse. As mentioned previously, if diode 10 fires, flip-flop 22 is switched to its zero voltage state until reset at the completion of the next discrimination operation. This results in a discharge of the capacitor until time $T_2$ when the next reset pulse is applied to flip-flop 22. Thus, the A.C. component increases at time $T_2$ as capacitor $C_{24}$ charges until time $T_2'$ when the enabling pulse is applied to "and" gate 21.

At time $T_2'$, the sum of the test current $I_T$ and the bias current $I_B$ are within the diode "zone of uncertainty." The diode may or may not fire at this time, although the probability of its firing is low since it is near the lower boundary of the zone. Assuming the diode does fire, the flip-flop returns to its low voltage state and the capacitor continues to discharge until the next discrimination operation is completed and flip-flop 22 is reset at time $T_3$. At the time $T_3'$ of the application of the next test pulse no uncertainty exists, since the bias current has decreased to a point just outside the zone. Thus, the diode does not fire and the flip-flop remains in its reset or high voltage state.

The capacitor charges until time $T_4$ whereupon the flip-flop is reset and another test is performed. As shown, the diode fires and the capacitor discharges. If the firing probabilities are continually observed, the capacitor voltage $E_c$ and the operating bias $I_B$ are confined to a range of the order of the zone of uncertainty. However, this is the ideal situation and occasional excursions therefrom such as shown at time $T_3$ may be experienced.

By selecting the time constant of the integrator to be at least as large as the product of the period between successive checkings and the ratio of the tunnel diode firing current to the width of the zone of uncertainty, the operating bias current $I_B$ is maintained essentially constant within a range of the order of the diode "zone of uncertainty" and in practice the deviation from the nominal bias current of 0.99 ma. has been found to be about 0.1 percent.

If the firing point of tunnel diode 10 should change during operation, the feedback loop provides a corresponding variation in operating bias. Tunnel diodes may experience a ±10 percent change in firing current for a 70 to 80° C. change in temperature and have a thermal time constant of the order of several milliseconds. Since the present device relies on an operating bias of 99 percent of the firing current, the temperature variation must be compensated for to prevent false triggering.

As the firing current begins to decrease, the sum of the test pulse and operating bias currents place the current through the diode in the upper portion of the zone of uncertainty. Thus, the diode probability of firing increases and for some test intervals the total current may be large enough to enter the certain zone. The flip-flop is then in its low voltage state discharging capacitor $C_{24}$ until a new operating bias is established. A similar operation occurs if the diode firing current should begin to increase with the corrected nominal operating bias spaced from the firing current by the original difference, or in the specific embodiment discussed. 0.01 ma.

To sustain this corrected operating bias, an imbalance occurs in the feedback loop as the number of diode firings differs from the number of non-firings in a particular interval. The number of firings relative to the number of non-firings decreases to compensate for an increase in the initial tunnel diode firing current. The effect of a single firing on the operating bias is of the order of the width of the zone of uncertainty and sustained firings or non-firings enable the bias current to track changes of 10 percent in the diode firing current within about 100 periods. For high speed pulse code modulation applications having a word rate or discrimination period of 3 microseconds, the time required to correct a 10 percent change is about 300 microseconds. This is a sufficient loop response for the discriminator in view of the tunnel diode having a thermal time constant in the millisecond range.

It will be noted from the above discussion that a portion of each word or comparison period is devoted to the checking and correcting of the operating bias. In one embodiment tested and operated, the comparison period was 3.2 microseconds including 0.4 microsecond for signal sample change-over at terminal 11. The high speed of the tunnel diode permitted the discrimination operation to be performed within 2.0 microseconds, thus enabling the diode to be time shared for 1.2 microseconds by the bias correction operation.

Figure 4:
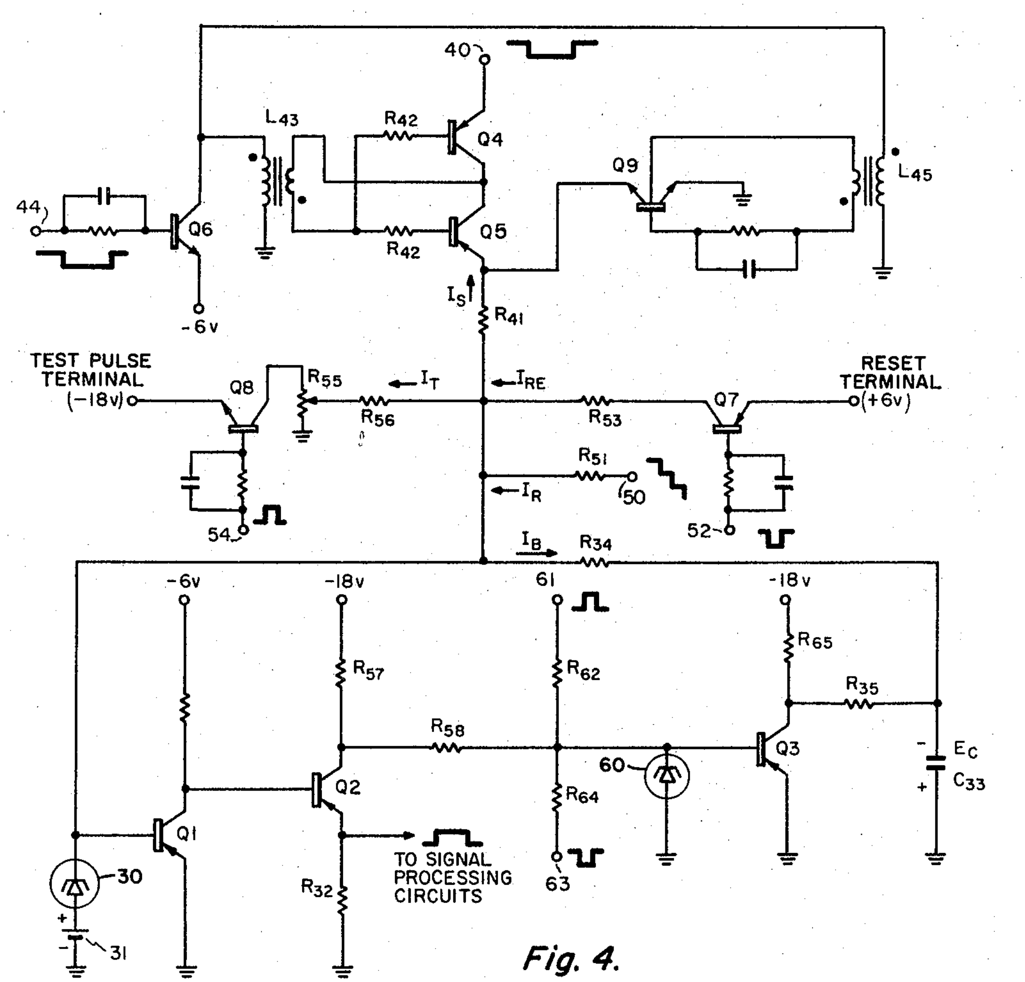
FIG. 4 is a schematic diagram of an embodiment of the invention employing a tunnel diode in the feedback loop.

Referring to the specific embodiment shown in FIG. 4, tunnel diode 30, having a 1 milliampere firing current, is shown with its anode connected to a positive voltage source 31 which in turn is referenced to ground. The magnitude of voltage source 31 is substantially equal to the diode peak voltage $V_P$ and is of the order of 50 millivolts. This in effect places the cathode of the tunnel diode at ground when it is in its first stable state. When the diode is triggered into its second stable state, its cathode goes negative and drives normally-off transistor $Q_1$ on. This in turn raises the collector voltage of transistor $Q_1$ and drives normally-on transistor $Q_2$ off. Transistor $Q_2$ is an emitter follower and when turned off, a positive pulse appears across emitter resistor $R_{32}$.

Tunnel diode 30 is triggered into its second state when the current therethrough is substantially equal to the diode firing current. A negative biasing current $I_B$ is established by connecting the diode cathode to the voltage $E_c$ appearing across capacitor $C_{33}$ through resistor $R_{34}$. The magnitude of resistor $R_{34}$ is selected such that at the designed-for nominal capacitor voltage $E_c$, bias current $I_B$ is nominally 0.99 milliampere.

At the start of the amplitude discriminating operation, the signal sample is applied at terminal 40. Terminal 40 is connected to the cathode of tunnel diode 30 through transistors $Q_4$ and $Q_5$ and resistor $R_{41}$. Transistors $Q_4$ and $Q_5$ are matched to have substantially equal off-set voltages and are connected so that the off-sets cancel. The bases of transistors $Q_4$ and $Q_5$ are tied through resistors $R_{42}$ and the secondary of transformer $L_{43}$ to their common collector connection. The transistors are normally on with the base drive being provided by the voltage induced on the secondary of transformer $L_{43}$ due to the current flowing through the transformer primary and normally conducting transistor $Q_6$.

As shown the emitter of transistor $Q_5$ is connected to ground through the emitters of integrated chopper transistor $Q_9$. The base and collector of integrated transistor $Q_9$ are connected together through the secondary of transformer $L_{45}$. This transistor is normally-off since the normally-on transistor $Q_6$ draws current through the primary of transformer $L_{45}$ which in turn induces a voltage in the secondary that drives the base of transistor $Q_9$ negative with respect to ground.

During the checking operation, the signal sample is removed from the tunnel diode circuit. A negative pulse applied at terminal 44 to the base of transistor $Q_6$ turns transistor $Q_6$ off and reverses the drive on the base circuit of transistors $Q_4$ and $Q_5$. At the same time, the voltage change across the primary of transformer $L_{45}$ induces a voltage in the secondary which drives the base of transistor $Q_9$ positive and connects the emitter of $Q_5$ to ground. This connection limits the transient current occurring upon the opening of the transistor $Q_4$ and $Q_5$ gate. While transistor $Q_6$ is non-conductive, the following signal sample may be applied to terminal 40 without transient currents being supplied to the tunnel diode. The duration of the negative pulses applied at terminal 44 control the time available for the checking operation and, in this embodiment, a pulse duration of 1.2 microseconds for a pulse repetition rate of 3.2 microseconds was found suitable.

Concurrently with the closing of the gate comprising transistors $Q_4$ and $Q_5$, the positive reference waveform is applied to terminal 50 and coupled through resistor $R_{51}$ to tunnel diode 30. Resistors $R_{41}$ and $R_{51}$ may be matched to have equal magnitudes, such as 1 kilo-ohm, so that when the signal sample and reference waveform have equal magnitudes, the sum of currents $I_R$ and $I_S$ is zero. If the signal sample exceeds the reference waveform by an amount sufficient to produce a net current of 0.01 milliampere, the sum of the bias current $I_B$ and currents $I_R$ and $I_S$ will trigger the diode into its second state.

At the completion of the reference waveform appearing at terminal 50, a pulse is applied at terminal 44 to disconnect the signal sample and connect the emitter of transistor $Q_5$ to ground. Concurrently therewith, a negative reset pulse is applied to terminal 52 to drive transistor $Q_7$ on and thereby raise its collector voltage to +6 volts. This voltage appears across the series combination of resistor $R_{53}$ and the tunnel diode and by selecting resistor $R_{53}$ to have a magnitude of about 4.7 kilo-ohms, the reset current $I_{RE}$ is about 1.2 milliamperes and opposes the bias current $I_B$ to reset tunnel diode in its first stable state.

The reset pulse is then removed, and a positive pulse is applied to terminal 54 to drive transistor $Q_8$ on. This causes the −18 volt emitter voltage to be applied across tapped resistor $R_{55}$. The tap is connected to the cathode of the diode through resistor $R_{56}$ and is adjusted such that a test current $I_T$ of 0.01 milliampere flows through the diode. The sum of the test current and the nominal operating bias current $I_B$ equal the tunnel diode firing current of 1 milliampere. This should bring tunnel diode 30 to its firing point if neither the operating bias nor the tunnel diode firing level has changed. At the completion of the test pulse, the operating bias current $I_B$ maintains the state of the diode.

If diode 30 fires upon application of the test pulse, transistor $Q_1$ is driven on which in turn renders transistor $Q_2$ non-conductive so that its collector potential is substantially negative. This draws a negative current through second tunnel diode 60 and resistors $R_{57}$ and $R_{58}$.

Tunnel diode 60 has a 5 milliampere firing current and is utilized as both the "and" and bistable elements in the feedback loop of FIG. 1 and provides a resultant economy of parts. The magnitude of resistors $R_{57}$ and $R_{58}$ are selected so that turning transistor $Q_2$ off causes about 4 milliamperes to flow through diode 60. If tunnel diode 30 has not fired upon the application of the test pulse at terminal 54, the collector of transistor $Q_2$ is closer to ground and a reduced current flows through diode 60.

At this time, a negative pulse is applied at terminal 63 and draws a negative current through resistor $R_{64}$ and diode 60. The pulse magnitude and the resistor $R_{64}$ are selected such that an "and" or enabling current of about 2 milliamperes flows through the diode 60. This fires the tunnel diode 60 only if tunnel diode 30 has fired when tested as the total current through the diode exceeds the 5 ma. firing current.

The firing of diode 60 drives the base of transistor $Q_3$ negative and turns it on. This places the collector of transistor $Q_3$ at ground and causes the capacitor $C_{33}$ to discharge. If diode 60 had not fired, the collector of transistor $Q_3$ would be considerably more negative and capacitor $C_{33}$ would charge to a higher voltage through resistors $R_{65}$ and $R_{35}$.

Upon completion of the checking operation, the reference waveform and the signal sample are applied at terminals 40 and 50. The gate comprising transistors $Q_4$ and $Q_5$ is closed by the removal of the pulse from terminal 44 and concurrently therewith a reset pulse is applied at terminal 52 to reset tunnel diode 30 into its first stable state at the start of the discrimination operation. The coincidence of the removal of the pulse at terminal 44 and the application of a pulse at terminal 52 minimize the possibility of a transient current initially firing tunnel diode 30.

In addition, at the completion of the discrimination when the test pulse is applied at terminal 54, tunnel diode 60 is reset to its first stable state by the application of a positive reset pulse to terminal 61. The pulse magnitude and resistor $R_{62}$ are selected such that a reset current of about 7 milliamperes flows therethrough to offset the opposing current flow through resistors $R_{57}$ and $R_{58}$.

The operating bias current $I_B$ has a nominal value of 0.99 milliampere and is established by the output of the integrating means comprising resistor $R_{35}$ and capacitor $C_{33}$. Since in the above circuit it is desired to place capacitor voltage $E_c$ in the middle of its dynamic range and capacitor voltage $E_c$ is nominally 9 volts, resistor $R_{34}$ is about 9 kilo-ohms. It is to be noted that the voltage $E_c$ across the capacitor is continually varying depending on the firing or non-firing of tunnel diode 30 when tested.

In this embodiment, resistors $R_{65}$ and $R_{35}$ were 1.5 and 1.0 kilo-ohms respectively with capacitor $C_{33}$ being 40 microfarads. The time constant of the integrating means was about 4 milliseconds. The ratio of the tunnel diode 30 firing current to the width of the zone of uncertainty was found to be 1,000 and the total period for amplitude discrimination and checking was 3.2 microseconds. The operating bias $I_B$ was found to be substantially as shown in the graph of FIG. 3.

The variation or swing of capacitor voltage $E_c$ for an individual period is found to limit the swings of the operating bias to a range of the order of the width of the zone of uncertainty. If desired, these swings may be reduced by increasing the time constant of the integrator. However, it is to be noted that the time constant if made substantially longer than the product of the ratio of the tunnel diode firing current to the width of the zone of uncertainty and the total period will decrease the feedback loop response to a variation in the firing current of tunnel diode 30. The above discussed embodiment has been found to measure a signal sample of 10 millivolts applied at terminal 40 with less than a 10 percent error for temperature variations of 100° C.

It will be noted that although the invention has been described with reference to a single-ended amplitude discriminator, it may be readily employed in a bipolar or double-ended discriminator wherein a balanced pair of tunnel diodes having equal firing currents are employed as the decision-making element. In this type of discriminator, the tunnel diodes are connected in series and the signal source, reference source, and feedback loop are coupled to the diode common connecting point. The nominal operating bias is applied across the two diodes and is sufficient to fire only one. The particular diode firing during discrimination is determined by the polarity of the net signal applied to the common connection.

Upon completion of the discrimination operation, the diode is reset and a signal sufficient to fire only one diode is applied across the series combination. The voltage at the common connection will go positive or negative depending upon which diode fired. The voltage is fed through the feedback loop as previously described. However, the output of the bistable element in the loop is now set to be either +E or −E rather than −E or 0, as the desired nominal capacitor voltage is zero. It is to be noted that if the diode firing currents remain equal, each diode should fire one-half the number of checkings and no correction is provided. If after a plurality of checkings, one diode fires more than another, the feedback loop provides a corresponding correction or bias current to compensate for any unbalance in the tunnel diode firing currents and thereby maintains the sensitivity of the discriminator substantially constant.

While the above discussion has referred to a specific embodiment, it is noted that many changes and modifications thereof may be made without departing from the spirit and scope of the invention.

What is claimed is:

1. In combination with an amplitude discriminator wherein the sensitivity of the included amplitude decision-making means is periodically checked, a feedback circuit for maintaining the sensitivity substantially constant which comprises (a) amplifying means coupled to the output of said discriminator for inverting and amplifying the output thereof during checking, (b) integrating means coupled to the output of the amplifying means, and (c) impedance means coupled to the output of said integrating means and to the decision-making element of the amplitude discriminator, the current supplied through said impedance means maintaining the sensitivity of the discriminator substantially constant.

2. In combination with an amplitude discriminator wherein the sensitivity of the included amplitude decision-making means is periodically checked, a feedback circuit for maintaining the sensitivity substantially constant which comprises (a) amplifying means coupled to the output of said discriminator for inverting and amplifying the output thereof during checking, (b) integrating means coupled to the output of the amplifying means, said integrating means having a time constant substantially greater than the period between checkings, and (c) resistive means coupled to the output of said integrating means and to the decision-making element of the amplitude discriminator, the current supplied through said resistive means maintaining the sensitivity of the discriminator substantially constant.

3. In combination with a tunnel diode amplitude discriminator wherein the sensitivity of the tunnel diode decision-making element is periodically checked, a feedback circuit for supplying a bias current thereto to maintain the sensitivity substantially constant which comprises (a) amplifying means coupled to the output of said discriminator for inverting and amplifying the output thereof during checking, (b) integrating means coupled to the output of the amplifying means, said integrating means having a time constant at least as large as the product of the period between successive checkings and the ratio of the magnitude of the decision-making element firing current to the width of the zone of uncertainty of said element, and (c) resistive means coupled to the output of said integrating means and to the decision-making element of said amplitude discriminator, the bias current supplied through said resistive means maintaining the sensitivity of the discriminator substantially constant.

4. In combination with a tunnel diode amplitude discriminator wherein the sensitivity of the tunnel diode decision-making element is periodically checked, a feedback circuit for supplying a bias current thereto to maintain the sensitivity substantially constant which comprises (a) gate means coupled to the output of said amplitude discriminator, said gate means adapted to be energized during checking to permit passage of the discriminator output signal therethrough, (b) a bistable element having high and low output states, said bistable element coupled to the output of said gate means and inversely responsive to the output signal thereof, (c) integrating means coupled to the output of said bistable means, said integrating means having a time constant at least as large as the product of the period between successive checkings and the ratio of the magnitude of the decision-making element firing current to the width of the zone of uncertainty of said element, and (d) resistive means coupled to the output of said integrating means and to the decision-making element of said amplitude discriminator, the bias current supplied through said resistive means maintaining the sensitivity of the discriminator substantially constant.

5. In combination with a tunnel diode amplitude discriminator wherein the sensitivity of the tunnel diode decision-making element is periodically checked, a feedback circuit for supplying a bias current thereto to maintain the sensitivity substantially constant which comprises (a) gate means coupled to the output of said amplitude discriminator, said gate means adapted to be energized during checking to permit passage of the discriminator output signal therethrough, (b) means coupled to said gate means for energizing said gate during checking, (c) a bistable element having high and low output states, said bistable element coupled to the output of said gate means and inversely responsive to the output signal thereof, (d) resistance-capacitance integrating means coupled to the output of said bistable means, said integrating means having a time constant at least as large as the product of the period between successive checkings and the ratio of the magnitude of the decision-making element firing current to the width of the zone of uncertainty, and (e) resistive means coupled to the output of said integrating means and to the decision-making element of said amplitude discriminator, said resistive means having a magnitude substantially larger than the resistance of said integrating means, the bias current supplied through said resistive means maintaining the sensitivity of the discriminator substantially constant.

6. In combination with a tunnel diode amplitude discriminator wherein the sensitivity of the tunnel diode decision-making element is periodically checked, a feedback circuit for supplying a bias current thereto to maintain the sensitivity substantially constant which comprises (a) first resistance means coupled to the output of said amplitude discriminator, (b) a tunnel diode having first and second stable states coupled to said first resistance, said resistance and tunnel diode being connected across the output of said amplitude discriminator with the output signal thereof providing a corresponding current through said diode, the magnitude of said first resistance being such that the discriminator output signals are insufficient to fire said diode into its second state, (c) means coupled to said tunnel diode for supplying an enabling current thereto during checking of the discriminator, said current being less than that required to fire said diode into its second state, the sum of said enabling current and the discriminator output current being sufficient to fire said diode, (d) means coupled to said diode for supplying a current thereto to reset said diode to its first state prior to the next discriminator checking, (e) amplifying means connected to said tunnel diode, (f) resistance-capacitance integrating means coupled to the output of said amplifying means, said integrating means having a time constant at least as large as the product of the period between successive discriminator checkings and the ratio of the magnitude of the descision-making element firing current to the width of the zone of uncertainty, and (g) resistive means coupled to the output of said integrating means and to said decision-making element, said resistive means having a magnitude substantially larger than the resistance of said integrating means, the bias current supplied through said resistive means maintaining the sensitivity of the discriminator substantially constant.

7. In combination with a single-ended tunnel diode amplitude discriminator wherein the sensitivity of the decision-making diode is periodically checked by the application of a test current equal to the difference between the tunnel diode firing current and the nominal bias current thereof, a feedback circuit for maintaining the sensitivity substantially constant which comprises (a) amplifying means coupled to the output of said discriminator for inverting and amplifying the output thereof during checking, (b) resistance-capacitance integrating means coupled to the output of said amplifying means, said integrating means having a time constant at least as large as the product of the period between successive checkings and the ratio of the tunnel diode firing current to the width of the zone of uncertainty, and (c) resistive means having a magnitude substantially larger than the resistance of said integrating means coupled to the output of said integrating means and to the decision-making diode, the magnitude of said resistive means being such that the nominal bias current is supplied to said tunnel diode at the nominal output of said integrating means, the nominal bias current supplied to said tunnel diode being modulated to maintain the discriminator sensitivity substantially constant.

8. In combination with a single-ended tunnel diode amplitude discriminator wherein the sensitivity of the decision-making tunnel diode is periodically checked by the application of a test current equal to the difference between the tunnel diode firing current and the nominal bias current thereof, a feedback circuit for maintaining the sensitivity substantially constant which comprises (a) gate means coupled to the output of said amplitude discriminator, said gate means adapted to be energized during checking to permit passage of the discriminator response thereto, (b) a bistable element having high and low output states, said bistable element coupled to the output of said gate means and inversely responsive to the output thereof, (c) resistance-capacitance integrating means coupled to the output of said bistable element, said integrating means having a time constant at least as large as the product of the period between successive checkings and the ratio of the tunnel diode firing current to the width of the zone of uncertainty, and (d) resistive means having a magnitude substantially larger than the resistance of said integrating means coupled to the output of said integrating means and to the decision-making tunnel diode, the magnitude of said resistive means being such that the nominal bias current is supplied to said tunnel diode at the nominal output of said integrating means, the nominal bias current supplied to said tunnel diode being modulated to maintain the discriminator sensitivity substantially constant.

9. An amplitude discriminator which comprises (a) a tunnel diode having first and second stable states, said diode being triggered into its second stable state when the current therethrough is substantially equal to the firing current and reset when the current therethrough is substantially equal to the valley current, (b) reference means coupled to said diode for supplying a reference current thereto, (c) signal means coupled to said diode for supplying a signal current thereto, (d) switch means coupled to said reference and signal means and adapted to remove said reference and signal currents from said diode, (e) test means coupled to said tunnel diode for supplying a test current thereto equal to the difference between the diode firing current and the nominal bias current supplied thereto when said signal and reference currents have been removed, (f) reset means coupled to said tunnel diode for supplying a reset current thereto at the completion of said signal and reference currents and said test current, (g) amplifying means coupled to said tunnel diode for amplifying and inverting the voltage therecross when said test current is supplied thereto,
(h) integrating means coupled to the output of said amplifying means, said integrating means having a time constant at least as large as the product of the period between application of successive test current and the ratio of the tunnel diode firing current to the width of the zone of uncertainty, and
(i) resistive means coupled to the output of said integrating means and to the tunnel diode, said resistive means having a magnitude such that at the nominal output voltage of said integrating means the nominal bias current is supplied to said tunnel diode, the nominal bias current supplied to said diode being modulated to maintain the discriminator sensistivity substantially constant.

10. An amplitude discriminator which comprises
(a) a first tunnel diode having first and second stable states, said diode being triggered into second stable state when the current therethrough is substantially equal to the firing current and reset when the current therethrough is substantially equal to the valley current,
(b) reference means coupled to said first diode for supplying a reference current thereto,
(c) signal means coupled to said first diode for supplying a signal current thereto,
(d) switch means coupled to said signal and reference means and adapted to remove said reference and signal currents from said first diode,
(e) test means coupled to said first tunnel diode for supplying a test current thereto equal to the difference between the first diode firing current and the nominal bias current supplied thereto when said signal and reference currents have been removed,
(f) reset means coupled to said first tunnel diode for supplying a reset current thereto at the completion of said signal and reference currents and said test current,
(g) amplifying means coupled to said first tunnel diode for amplifying and inverting the voltage thereacross,
(h) first resistive means coupled to the output of said amplifying means,
(i) a second tunnel diode coupled to said first resistive means having first and second stable states, said first resistive means having a magnitude such that the output current supplied to said second diode when said first diode has not fired is insufficient to fire said second diode,
(j) means coupled to said second diode for supplying an enabling current thereto having a magnitude insufficient to fire said second diode, the sum of said enabling current and said output current being sufficient to fire said second diode,
(k) means coupled to said second tunnel diode for supplying a reset current thereto following the application of said enabling current,
(l) integrating means coupled across said second tunnel diode, said integrating means having a time constant at least as large as the product of the period between test currents and the ratio of the first tunnel diode firing current to the width of the zone of uncertainty, and
(m) second resistive means coupled to the output of said integrating means and to said first tunnel diode, said means having a magnitude such that at the nominal integrating means output the nominal bias current is supplied to said first diode, the nominal bias current supplied to said diode being modulated to maintain the discriminator sensitivity substantially constant.

References Cited by the Examiner

UNITED STATES PATENTS

| | | | |
|---|---|---|---|
| 2,850,627 | 9/1958 | Moore et al. | 328—175 X |
| 2,986,655 | 5/1961 | Wiseman et al. | 307—88.5 |
| 3,061,671 | 10/1962 | Waller | 307—88.5 |

ARTHUR GAUSS, *Primary Examiner.*

J. S. HEYMAN, *Assistant Examiner.*